(12) United States Patent
Matori (10) Patent No.: US 10,921,166 B2
(45) Date of Patent: Feb. 16, 2021

(54) SENSOR BRACKET

(71) Applicant: HONDA MOTOR CO., LTD., Tokyo (JP)

(72) Inventor: Tadahiro Matori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 238 days.

(21) Appl. No.: 16/005,728

(22) Filed: Jun. 12, 2018

(65) Prior Publication Data

US 2018/0364076 A1    Dec. 20, 2018

(30) Foreign Application Priority Data

Jun. 20, 2017  (JP) .............................. JP2017-120539

(51) Int. Cl.
| | |
|---|---|
| *B60R 11/04* | (2006.01) |
| *G01D 11/30* | (2006.01) |
| *F16M 13/02* | (2006.01) |
| *G03B 17/56* | (2021.01) |
| *B60R 11/00* | (2006.01) |

(52) U.S. Cl.
CPC .............. *G01D 11/30* (2013.01); *B60R 11/04* (2013.01); *F16M 13/02* (2013.01); *G03B 17/561* (2013.01); *B60R 2011/0026* (2013.01); *B60R 2011/0043* (2013.01); *B60R 2011/0078* (2013.01)

(58) Field of Classification Search
CPC ...... G01D 11/30; G01D 11/305; B60R 11/04; B60R 2011/0043; B60R 2011/0026; B60R 2011/0078; F16M 13/02; G03B 17/561
USPC .............. 73/431, 273, 756, 493, 494, 866.5; 348/118–120, 148, 149; 248/682, 685, 248/689, 205.1, 200, 220.21–231.91
See application file for complete search history.

(56) References Cited

U.S. PATENT DOCUMENTS

| | | | | |
|---|---|---|---|---|
| 6,007,239 | A * | 12/1999 | Nickol ................... | G01K 15/00 374/1 |
| 8,734,020 | B2 * | 5/2014 | Ito ........................... | F16O 33/80 384/448 |
| 2017/0240120 | A1 | 8/2017 | Krug et al. | |

FOREIGN PATENT DOCUMENTS

| | | | |
|---|---|---|---|
| EP | 1484921 | * | 8/2004 |
| EP | 3173289 | | 5/2017 |

(Continued)

OTHER PUBLICATIONS

Japanese Office Action for Japanese Patent Application No. 2017-120539 dated Oct. 16, 2018.

*Primary Examiner* — Robert R Raevis
(74) *Attorney, Agent, or Firm* — Amin, Turocy & Watson LLP (57) ABSTRACT

A sensor bracket includes a locking wall formed on a bracket main body of the sensor bracket and to which a side surface of the engaging is locked in a pressed state, the side surface of the engaging protrusion being formed so as to cross with a protruding direction of the engaging protrusion; and a biasing piece having a base section and a tip region, the base section being formed so as to be supported by the bracket main body, the tip region being formed so as to abut the side surface of the engaging protrusion and to bias the engaging protrusion in a direction pressing against the locking wall, wherein a plurality of bending deformation sections bent in a state in which the biasing piece is biasing the engaging protrusion against the locking wall are installed between the base section and the tip region of the biasing piece.

7 Claims, 11 Drawing Sheets

(56) References Cited

FOREIGN PATENT DOCUMENTS

| JP | 2016-016830 | 2/2016 |
|----|-------------|--------|
| JP | 2017-523088 | 8/2017 |
| JP | 2017-171164 | 9/2017 |
| WO | 2016/023621 | 2/2016 |

* cited by examiner

SENSOR BRACKET

CROSS-REFERENCE TO RELATED APPLICATION

Priority is claimed on Japanese Patent Application No. 2017-120539, filed Jun. 20, 2017, the content of which is incorporated herein by reference.

BACKGROUND OF THE INVENTION

Field of the Invention

The present invention relates to a sensor bracket.

Description of Related Art

A sensor such as an on-vehicle camera or the like may be attached to a vehicle body-side member such as a glass windshield or the like via a separate sensor bracket (for example, see Japanese Unexamined Patent Application, First Publication No. 2016-16830).

The sensor bracket disclosed in Japanese Unexamined Patent Application, First Publication No. 2016-16830 includes a first bracket attached to the vehicle body-side member, and a second bracket configured to hold the on-vehicle camera (the sensor) together with the first bracket. The on-vehicle camera includes an engaging protrusion protruding laterally from a side surface, and the engaging protrusion is sandwiched between an L-shaped support wall of the first bracket and an elastic arm of the second bracket. The elastic arm of the second bracket extends linearly from a bracket main body, and is elastically deformed about a root section when the second bracket is assembled to the first bracket together with the on-vehicle camera. A repulsive force of the elastic arm generated at this time presses the engaging protrusion of the on-vehicle camera against the support wall of the first bracket.

SUMMARY

However, since the sensor bracket in the related art has a structure in which the elastic arm serving as a biasing piece configured to press the engaging protrusion is elastically deformed about a base section, when a biasing reaction force applied to the elastic arm is large, the stress applied to the root section of the elastic arm becomes high. Then, when the stress applied to the root section of the elastic arm is increased, there is concern that plastic deformation may occur in the root section of the elastic arm or aging degradation may be accelerated.

An aspect of the present invention is to provide a sensor bracket in which plastic deformation or aging degradation of a biasing piece is able to be suppressed.

A sensor bracket according to the present invention employs the following configurations.

(1) A sensor bracket according to an aspect of the present invention is a sensor bracket that holds a sensor having an engaging protrusion, the sensor bracket including: a locking wall formed on a bracket main body of the sensor bracket and to which a side surface of the engaging protrusion is locked in a pressed state, the side surface of the engaging protrusion being formed so as to cross with a protruding direction of the engaging protrusion; and a biasing piece having a base section and a tip region, the base section being formed so as to be supported by the bracket main body, the tip region being formed so as to abut the side surface of the engaging protrusion and to bias the engaging protrusion in a direction pressing against the locking wall, wherein a plurality of bending deformation sections bent in a state in which the biasing piece is biasing the engaging protrusion against the locking wall are installed between the base section and the tip region of the biasing piece.

According to the configuration of the above mentioned (1), the sensor presses the engaging protrusion against the locking wall of the bracket main body using the biasing piece, which is thus locked to the bracket main body. Since the biasing piece has a plurality of bending deformation sections, the bending deformation due to the biasing reaction force is distributed by the plurality of bending deformation sections, and thus, stress cannot be easily concentrated on a portion of the biasing piece.

(2) In the aspect of the above mentioned (1), the plurality of bending deformation sections may include at least two bending deformation sections having different bending directions with each other.

In the case of the aspect of the above mentioned (2), the biasing reaction force applied to the biasing piece is distributed in a plurality of directions, and generation of stress concentration on a portion of the biasing piece becomes more difficult.

(3) In the aspect of the above mentioned (1) or (2), a folded section curved in substantially a V shape as an initial shape may be formed in a deformation region closer to the tip region than to the base section of the biasing piece, a section among the deformation region of the biasing piece near the base section may be formed as a first bending deformation section of the biasing piece, and the folded section may be made as a second bending deformation section of the biasing piece.

In the case of the aspect of the above mentioned (3), the bending deformation of the biasing piece due to the biasing reaction force is distributed by the first bending deformation section and the second bending deformation section. When the first bending deformation section receives the biasing reaction force and is bent and deformed with a section of the biasing piece near the base section supported by the bracket main body serving as an origin, at this time, since the folded section which is the second bending deformation section is flexibly deformed, stress concentration on the first bending deformation section is suppressed. In the case of this configuration, since excessive deformation of the first bending deformation section using the section of the biasing piece near the base section as the origin can be suppressed, the engaging protrusion of the sensor can be stably pressed against the locking wall.

(4) In the aspect of the above mentioned (3), the biasing piece may be configured as a separate member from the bracket main body, and a support section length of the base section of the biasing piece supported by the bracket main body may be set to a length of a half or less than a half of a length obtained by adding the support section length and a length from the first bending deformation section to the second bending deformation section.

In the case of the aspect of the above mentioned (4), with respect to the support section length of the base section of the biasing piece, a region length available for the bending deformation between the first bending deformation section and the second bending deformation section is sufficiently secured. For this reason, large stress cannot be easily applied on the first bending deformation section by using the section of the biasing piece near the base section as the origin.

(5) In the aspect of the above mentioned (3) or (4), the bracket main body may include a displacement allowing chamber that accommodates the deformation region closer to the tip region of the biasing piece at more inner side than the base section of the biasing piece and that allows abutting and separating of the engaging protrusion with respect to the locking wall, and, at an inner wall of the displacement allowing chamber, a supporting point part, to which the first bending deformation section of the biasing piece abuts and which serves as a deformation supporting point of the first bending deformation section, and a concave section, which allows bending deformation of the biasing piece about the supporting point part, may be formed.

In the case of the aspect of the above mentioned (5), while having a structure in which the deformation region of the biasing piece is accommodated in the displacement allowing chamber of the bracket main body, the bending deformation of the first bending deformation section is allowed by the concave section formed in the inner wall. Accordingly, when this structure is employed, a biasing force of the biasing piece that presses the engaging protrusion can be stably obtained while protecting the biasing piece from the outside.

According to the aspect of the present invention, since the biasing piece that biases the engaging protrusion has a plurality of bending deformation sections, stress concentration cannot be easily generated on a portion of the biasing piece, and as a result, plastic deformation or aging degradation of the biasing piece can be suppressed.

DESCRIPTION OF EMBODIMENTS

Hereinafter, an embodiment of an aspect of the present invention will be described with reference to the accompanying drawings. Further, directions of forward, rearward, leftward, rightward, and the like shown below are the same as directions in a vehicle to which a sensor and a sensor bracket are attached described below unless the context clearly indicates otherwise. In addition, in appropriate places in the drawings used in the following description, an arrow FR showing a forward direction with respect to a vehicle, an arrow UP showing an upward direction with respect to a vehicle and an arrow LH showing a leftward direction with respect to a vehicle are provided.

Figure 1:
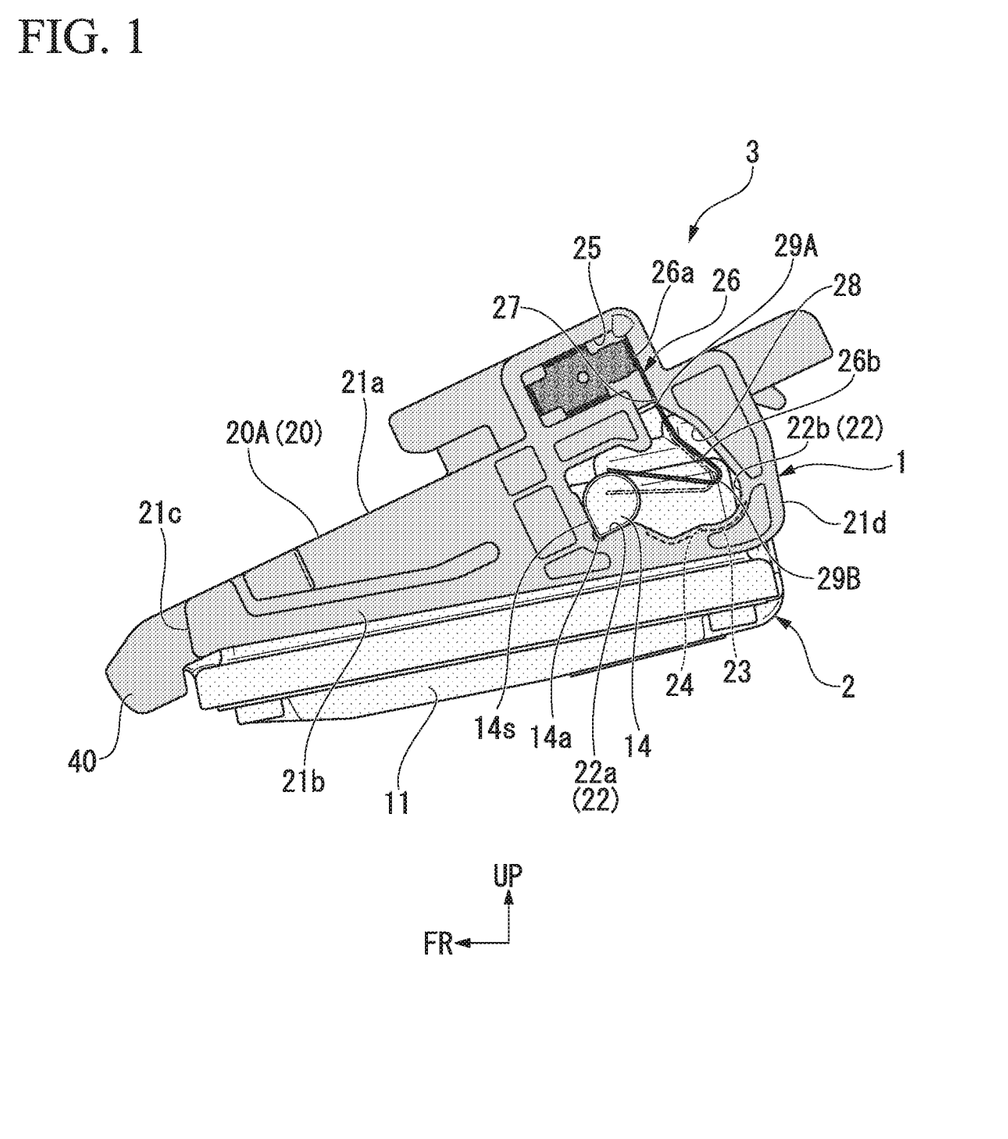
FIG. 1 is a side view of an assembly of a sensor bracket and a sensor according to an embodiment of the present invention.
Figure 2:
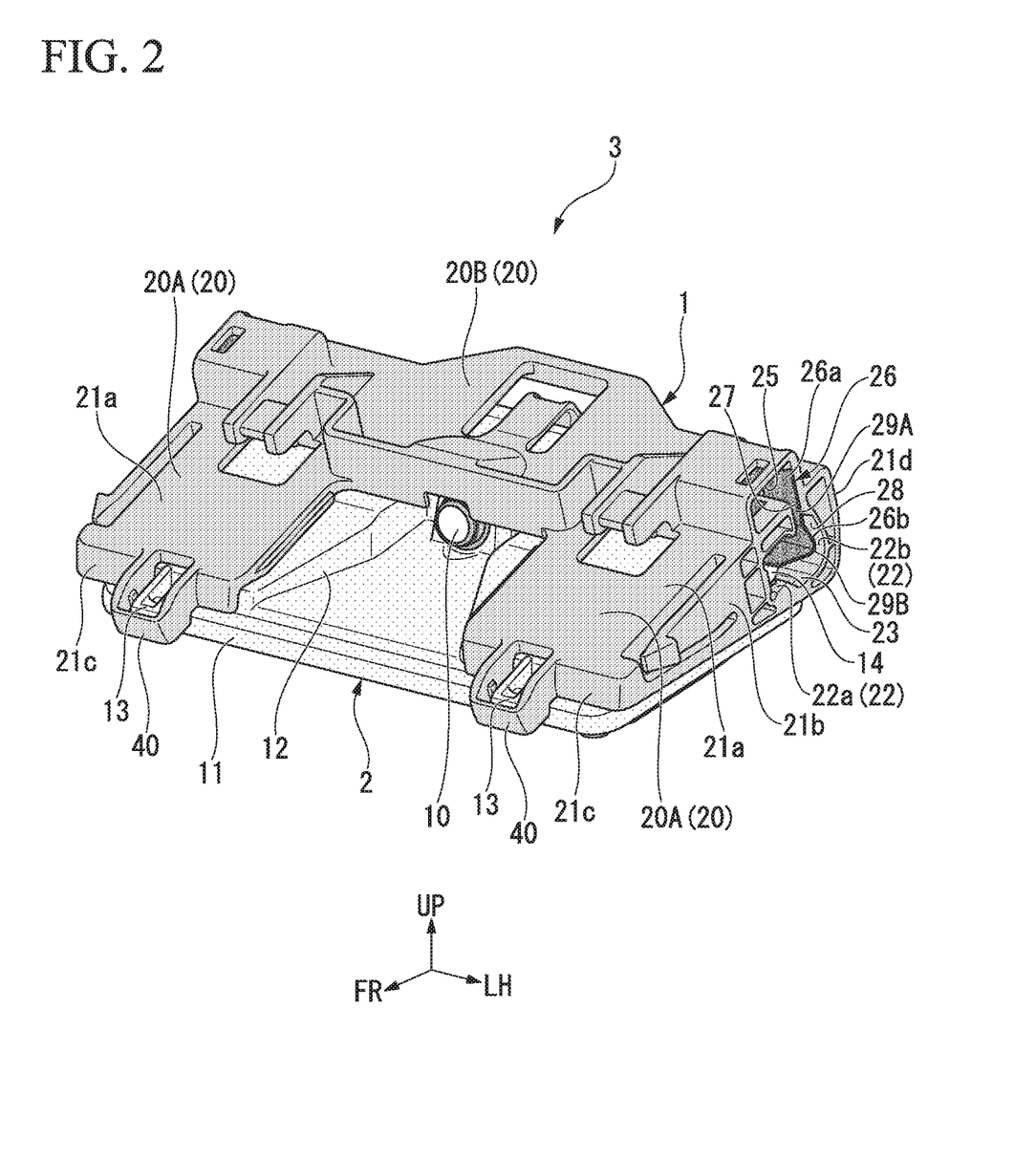
FIG. 2 is a perspective view of the assembly of the sensor bracket and the sensor of the embodiment of the present invention.

FIG. 1 is a view showing a left side surface of an assembly 3 of a sensor bracket 1 and a sensor 2 according to an embodiment, and FIG. 2 is a view showing the assembly 3 from a left upper side of a front section thereof.

In the embodiment, an on-vehicle camera attached to an inner surface of a glass windshield (not shown) is configured as the sensor 2. The assembly 3 is attached to the glass windshield such that a lens section 10 serving as a detection unit of the sensor 2 is directed to a side in front of a vehicle.

Figure 3:
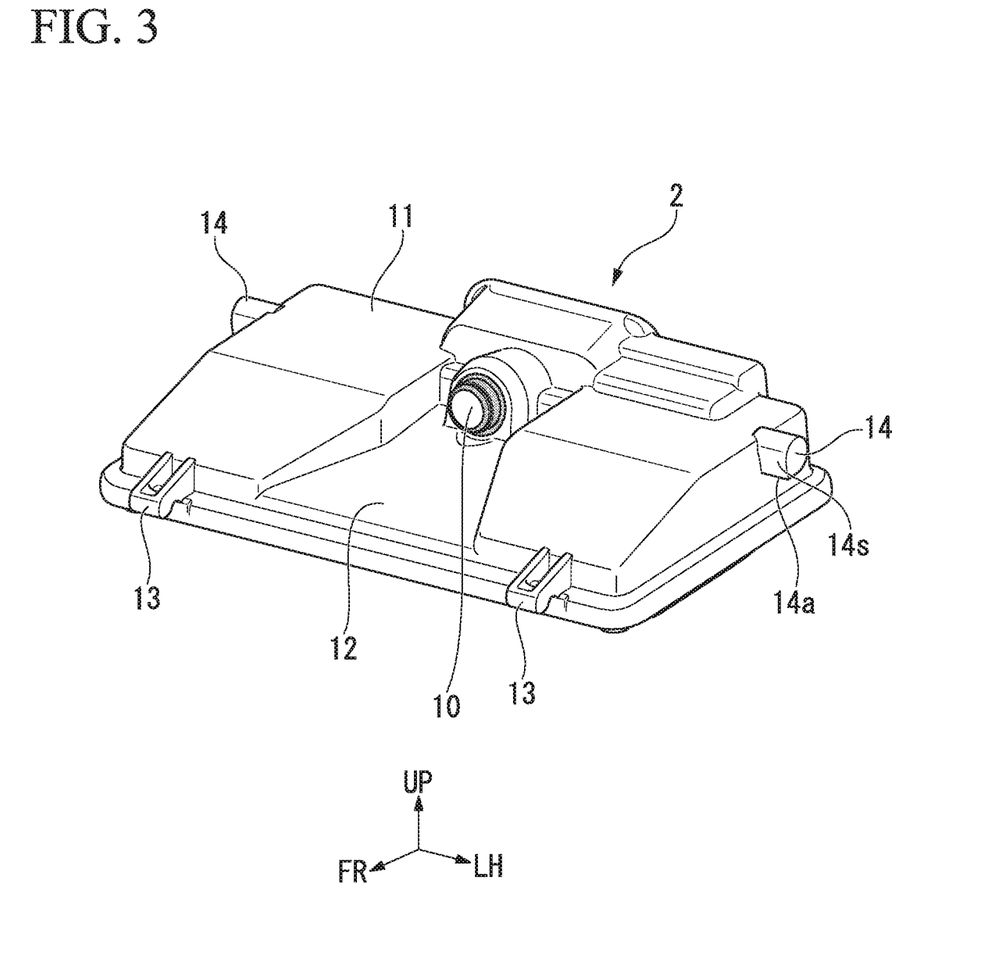
FIG. 3 is a perspective view of the sensor according to the embodiment of the present invention.
Figure 4:
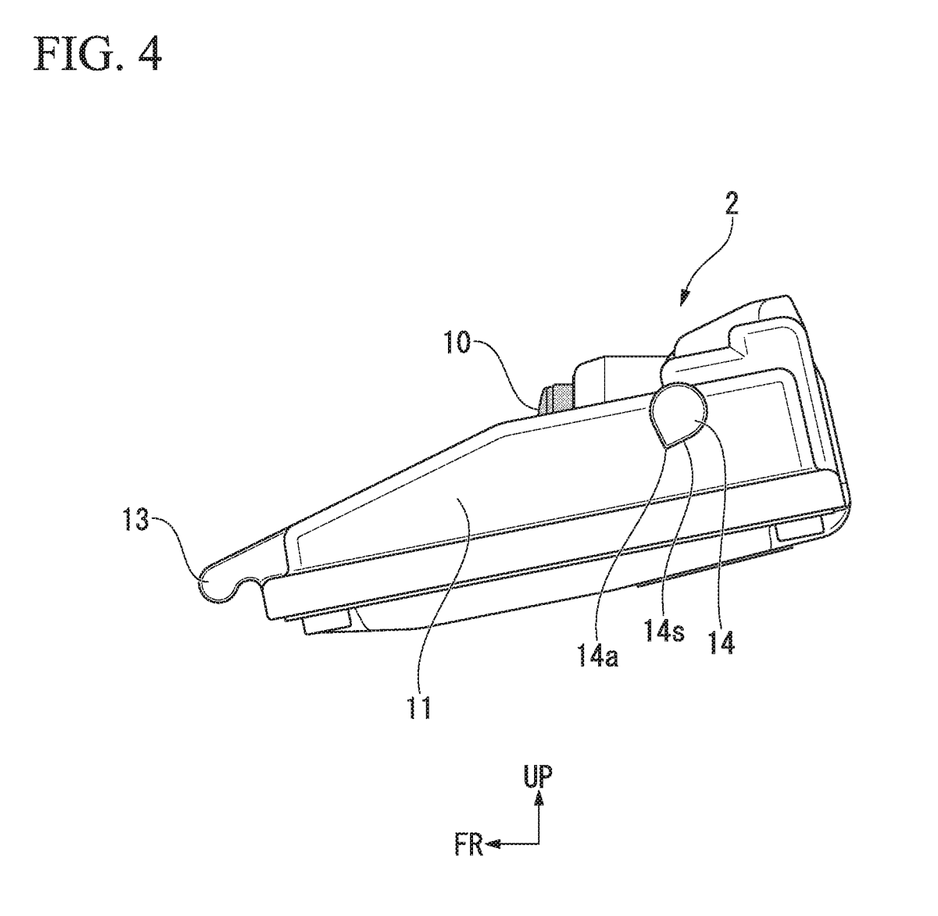
FIG. 4 is a side view of the sensor of the embodiment of the present invention.

FIG. 3 is a view showing the sensor 2 from a left upper side of the front section, and FIG. 4 is a view showing the sensor 2 from a left side.

The sensor 2 is disposed such that the lens section 10 is directed toward the front at substantially a center of a sensor body 11 having a substantially rectangular shape when seen in a plan view in a widthwise direction. A concave section 12 configured for opening the side in front of the lens section 10 is formed on an upper surface of the sensor body 11. Engaging claws 13 configured to lock a front edge portion of the sensor 2 to the sensor bracket 1 protrude from two positions spaced apart from each other on the front side of the sensor body 11 in the left and right direction. In addition, engaging protrusions 14 configured to lock a rear section of the sensor 2 to the sensor body 11 protrude from positions near the upper rear end of each of left and right side surfaces of the sensor body 11. The engaging protrusions 14 are formed in irregular circular cross-sectional shapes in which substantially right-angled corner sections 14a are formed to protrude at parts of the circular shapes, respectively.

Figure 5:
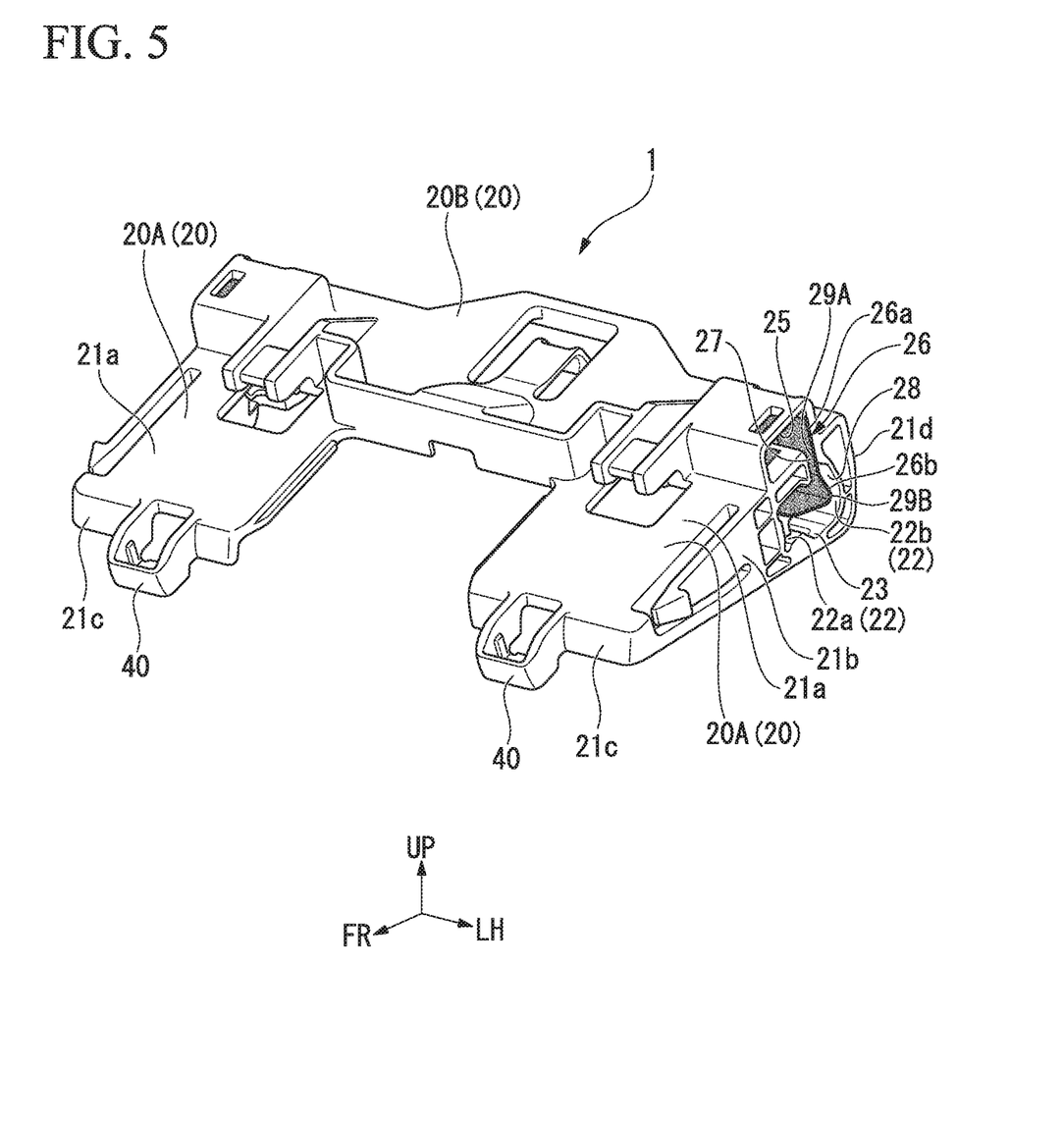
FIG. 5 is a perspective view of the sensor bracket of the embodiment of the present invention.
Figure 6:
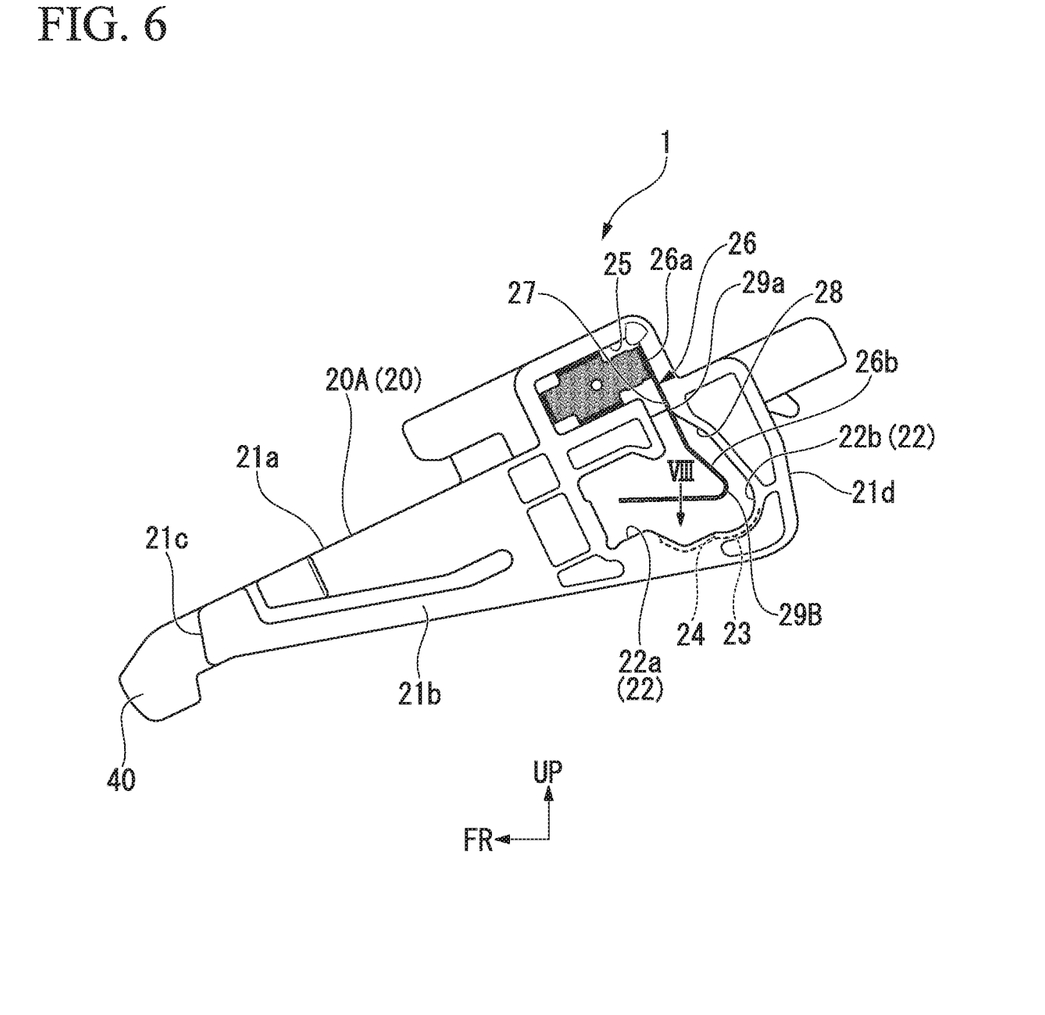
FIG. 6 is a side view of the sensor bracket of the embodiment of the present invention.

FIG. 5 is a view showing the sensor bracket 1 from a left upper side of the front section, and FIG. 6 is a view showing the sensor bracket 1 from a left side.

The sensor bracket 1 has a pair of left and right main support block sections 20A configured to cover left and right side edge regions of the sensor body 11 from above, and a connecting block section 20B configured to connect rear edge portions of the pair of main support block sections 20A. These sections are integrally formed of a resin material or the like. Each of the left and right main support block sections 20A has an upper wall 21a configured to cover an upper surface of a side region of the sensor body 11, a sidewall 21b configured to cover an outer side surface of the sensor body 11, and a front wall 21c and a rear wall 21d configured to cover a front surface and a rear surface of the sensor body 11. The left and right main support block sections 20A are formed symmetrically to each other, and the same functional parts are assembled thereto. In addition, the connecting block section 20B covers a rear region of the sensor body 11 at substantially a center in a widthwise direction from above. Imaging parts (not shown) connected to the lens section 10 are received in the rear region of the sensor body 11 at substantially the center in the widthwise direction.

In the embodiment, the left and right main support block sections 20A and the connecting block section 20B constitute a major part of a bracket main body 20.

Substantially rectangular restriction frame sections 40, into which tip portions of the left and right engaging claws 13 on the side of the sensor 2 are inserted from below a rear section thereof, are formed to protrude from the front wall 21c of the main support block sections 20A. Relative forward displacement of the front section of the sensor 2 with respect to the sensor bracket 1 is restricted when the tip portions of the engaging claws 13 abut front walls in the restriction frame sections 40.

Further, while the structure in which the tip portions of the engaging claws 13 abut the front walls in the restriction frame sections 40 is provided in the embodiment, the tip portions of the engaging claws 13 may not abut the front walls of the restriction frame sections 40.

Assembly holes 22 laterally passing through the sidewalls 21b are formed in rear regions of the sidewalls 21b of the main support block sections 20A. Upon assembly of the sensor 2 and the sensor bracket 1, the engaging protrusions 14 of the sensor 2 are disposed in the assembly holes 22. Each of the assembly holes 22 has a locking concave section 22a with which a side surface 14s of the engaging protrusion 14 (a side surface crossing a protruding direction of the engaging protrusion 14) abuts and is locked, and a displacement allowing section 22b formed adjacent to the locking concave section 22a.

Further, in the embodiment, the assembly holes 22 including the locking concave sections 22a and the displacement allowing sections 22b constitute a displacement allowing chamber.

Figure 7:
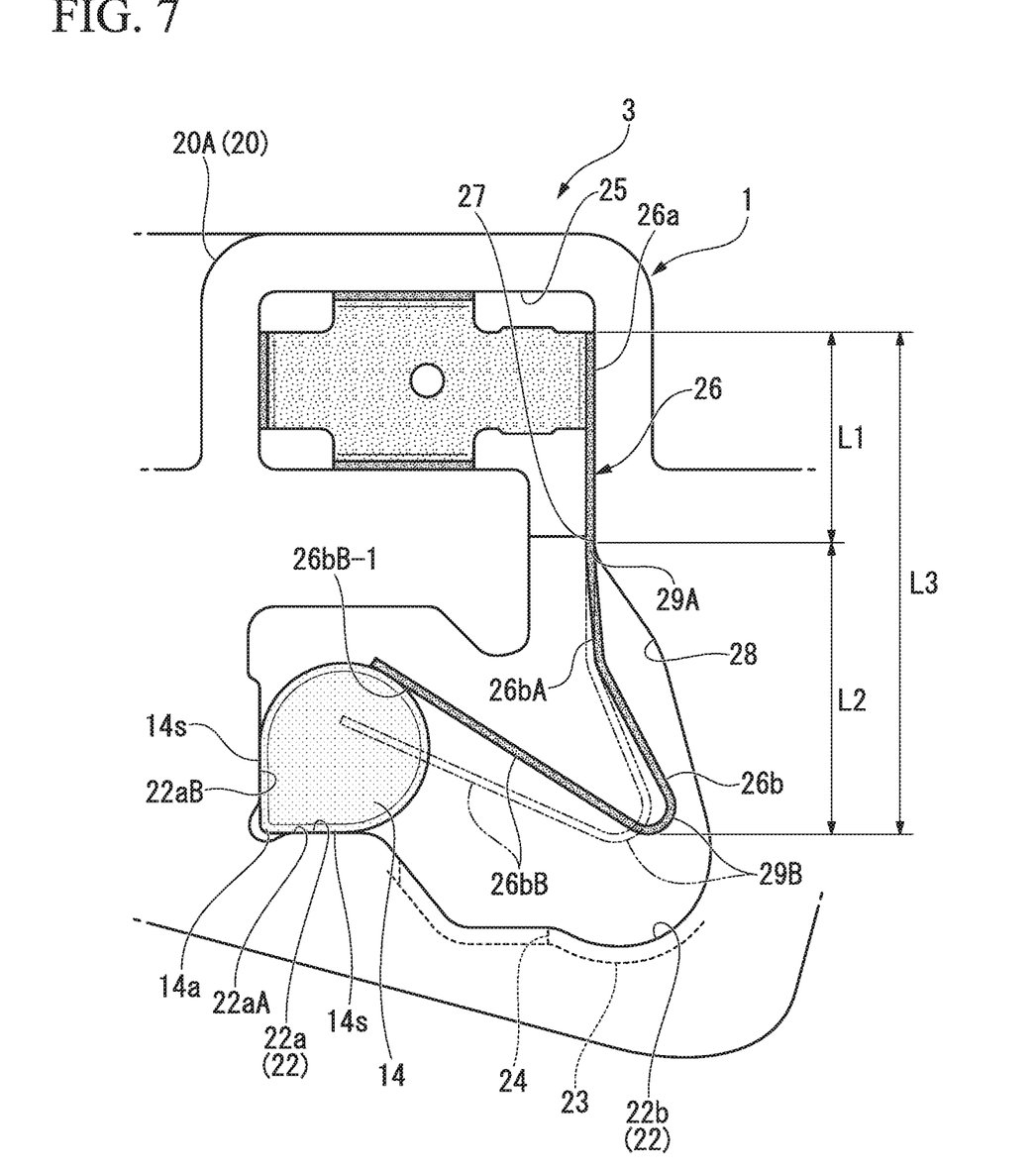
FIG. 7 is an enlarged side view of a portion of the assembly of the sensor bracket and the sensor of the embodiment of the present invention.

FIG. 7 is an enlarged view showing an assembly of the assembly hole 22 on the side of the sensor bracket 1 and the engaging protrusion 14 of the sensor 2.

As also shown in FIG. 7, the locking concave section 22a is disposed in a front lower end region of the assembly hole 22. The locking concave section 22a has a first locking wall 22aA, which is flat, extending linearly from a front end portion to a rear side, and a second locking wall 22aB extending linearly upward from the front end portion of the first locking wall 22aA at substantially right angles with respect to the first locking wall 22aA. The first locking wall 22aA and the second locking wall 22aB are walls extending inward from the bracket main body 20 in the widthwise direction to be continuous to each other, and the side surfaces 14s of the engaging protrusions 14 on the side of the sensor 2 (flat portions of the side surfaces 14s that sandwich the corner section 14a) abut the above mentioned walls. The rear region of the sensor 2 is locked and fixed to the sensor bracket 1 when the side surfaces 14s of the engaging protrusions 14 abut the first locking wall 22aA and the second locking wall 22aB in a pressed state.

In addition, the displacement allowing section 22b has a lower side region extending rearward from the rear end portion of the first locking wall 22aA of the locking concave section 22a after being inclined downward, a rear side region standing upward from the lower side region, and an upper side region extending rearward from an upper side of the locking concave section 22a. Walls extending inward in the widthwise direction of the bracket main body 20 extend from a portion of the lower side region, and the rear side region and the upper side region.

Figure 8:
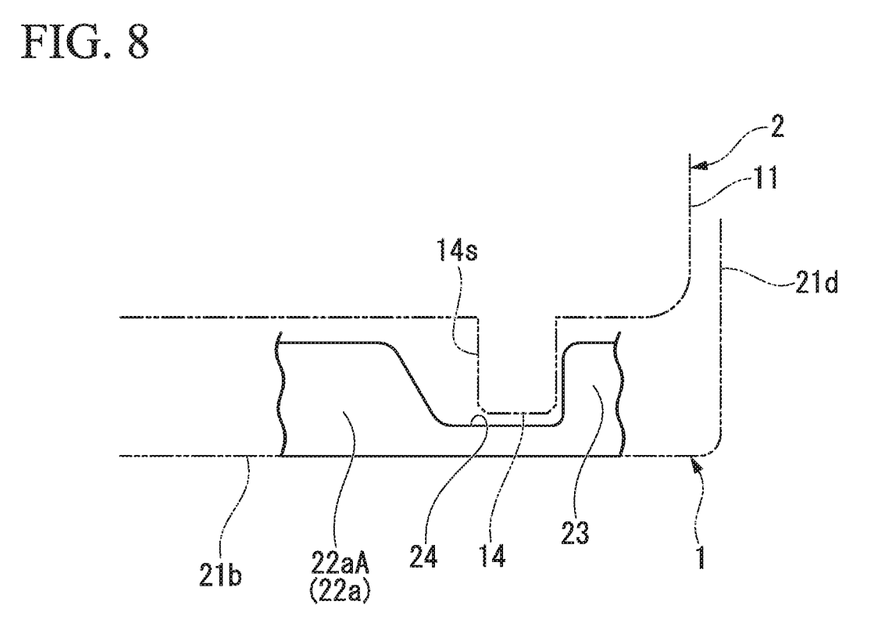
FIG. 8 is a view of the sensor bracket of the embodiment of the present invention taken along an arrow VIII of FIG. 6.

FIG. 8 is a schematic view showing the main support block sections 20A of the sensor bracket 1 from an arrow VIII of FIG. 6.

As shown in FIG. 8, a groove 24, that being adjacent to the first locking wall 22aA of the locking concave section 22a, that opening inside the main support block sections 20A in the widthwise direction and that having a predetermined forward/rearward width, is formed in a lower side region of the displacement allowing section 22b, and a movement restricting wall 23 is formed in the groove 24 on the side of the rear section. The groove 24 is a groove through which the engaging protrusions 14 of the sensor 2 can be inserted in an upward/downward direction. The sensor 2 can be assembled to or removed from the sensor bracket 1 when the left and right engaging protrusions 14 are aligned with the groove 24 corresponding to the sensor bracket 1 in the upward/downward direction.

In addition, the movement restricting wall 23 of the lower side region is a wall disposed adjacent to the rear section of the groove 24, and configured to support the engaging protrusions 14 from below when the sensor 2 is removed from the sensor bracket 1 and the engaging protrusions 14 of the sensor 2 are moved behind the groove 24. The movement restricting wall 23 suppresses abrupt downward movement (removal) of the engaging protrusions 14 through the groove 24 when the sensor 2 is removed from the sensor bracket 1.

Substantially rectangular concave sections 25 recessed inside in the widthwise direction are formed in upper sections of the assembly holes 22 of the sidewalls 21b of the main support block sections 20A. Plate springs 26 (biasing members or biasing pieces) configured to press the side surfaces 14s of the engaging protrusions 14 against the first locking wall 22aA and the second locking wall 22aB of the locking concave section 22a are attached to the concave sections 25. Rear lower ends of the concave sections 25 communicate with the assembly holes 22. The plate springs 26 attached into the concave sections 25 extend into the assembly holes 22 through communicating sections thereof.

The plate springs 26 have base sections 26a attached in the concave sections 25, and deformation regions 26b disposed closer to the tip portions than to the base sections 26a. The deformation regions 26b have first extension sections 26bA extending downward from the base sections 26a, and second extension sections 26bB extending linearly toward an upper side of the front section after being bent in substantially a V shape at lower ends of the first extension sections 26bA. Tip regions 26bB-1 of the second extension sections 26bB abut the engaging protrusions 14 at the front surface side and elastically press the side surfaces 14s of the engaging protrusions 14 against the locking concave sections 22a.

Here, supporting point parts 27 that abut the vicinity of boundary sections between the base sections 26a of the plate springs 26 and the deformation regions 26b from rearward and that serve as deformation supporting points when the deformation regions 26b deforms in the vicinity of the base sections 26a, and concave sections 28 that are configured to allow bending deformation toward rear sides of the deformation regions 26b about the supporting point parts 27, are formed in rear side regions of inner walls of the assembly holes 22. The supporting point parts 27 are constituted by ridge sections extending in a leftward/rightward direction. The vicinity of the boundary sections between the base sections 26a and the deformation regions 26b of the plate springs 26 are bent and deformed by abutting with the supporting point parts 27. The bent and deformed portions constitute first bending deformation sections 29A (curve-shaped sections) according to the embodiment. In addition, folded sections between the first extension sections 26bA and the second extension sections 26bB of the deformation regions 26b are bent in substantially a V shape as an initial shape. The folded sections constitute second bending deformation sections 29B (curve-shaped sections) according to the embodiment.

In addition, a support section length L1 of the base section 26a of the plate spring 26 by the bracket main body 20 is set to be a length of a half or less than a half of a length L3 obtained by adding the support section length L1 and a length L2 which is a length from the first bending deformation sections 29A to the second bending deformation sections 29B.

Figure 9:
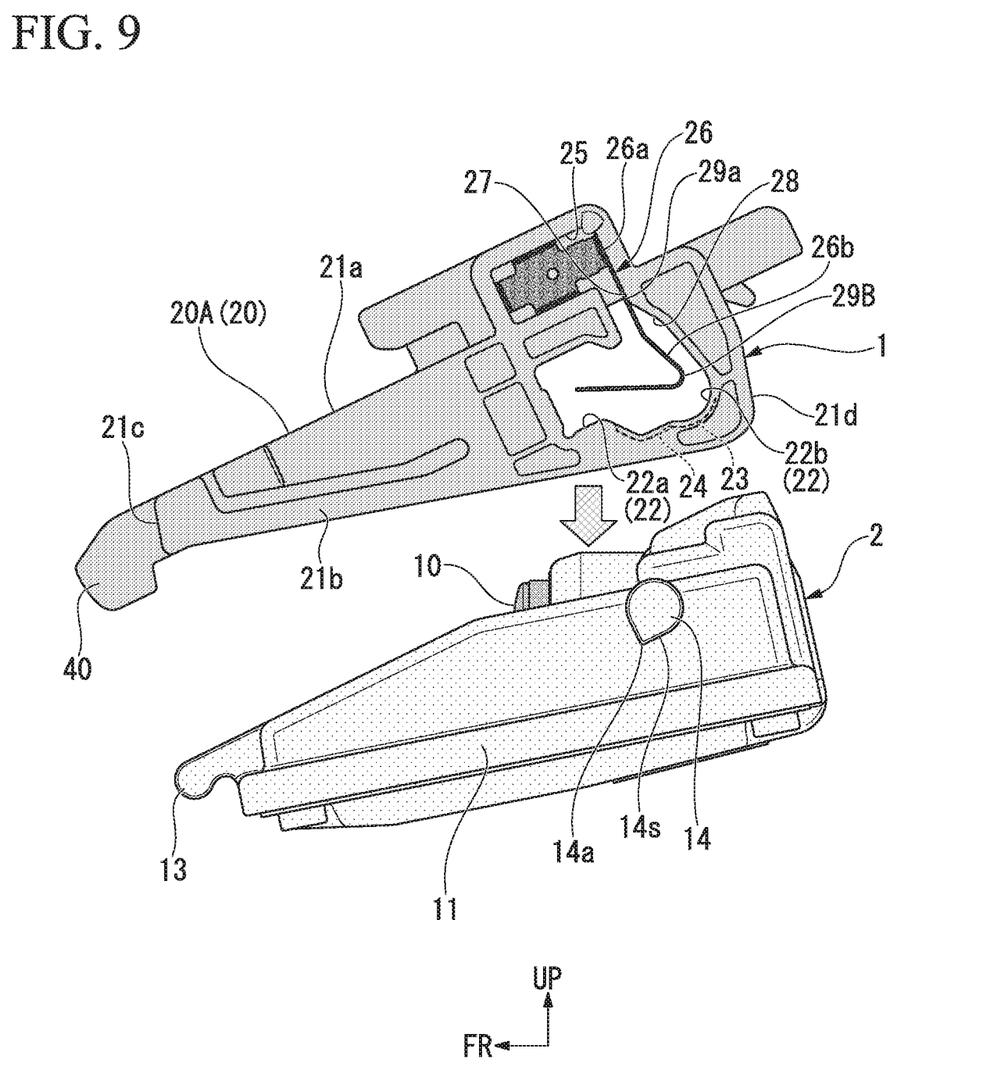
FIG. 9 is a side view of the sensor bracket and the sensor of the embodiment of the present invention.
Figure 10A:
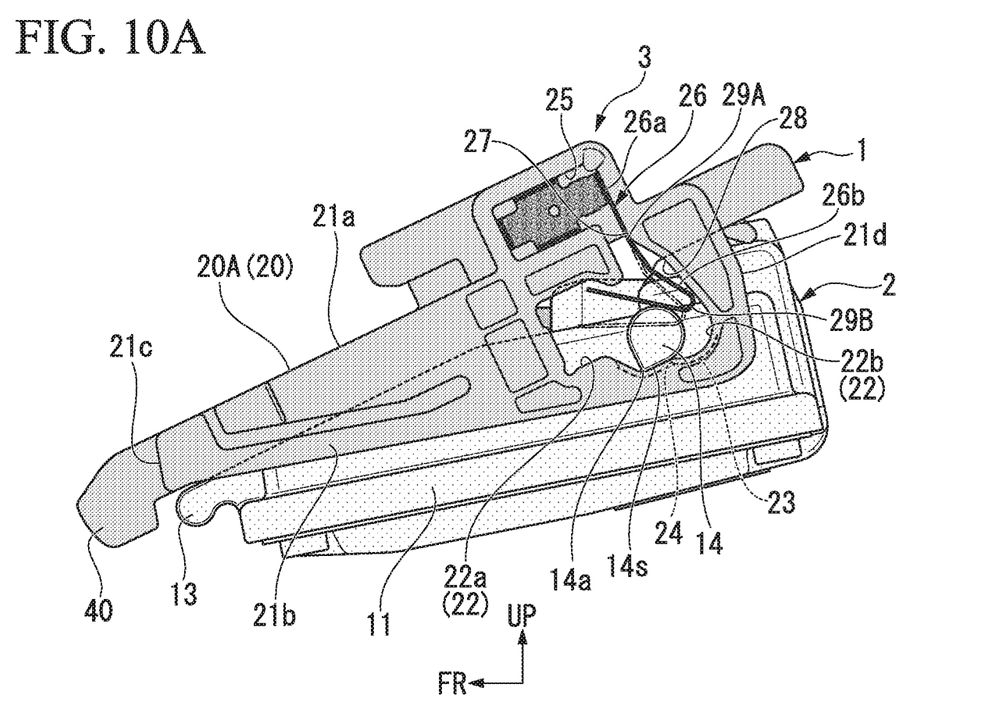
FIG. 10A is a side view showing an assembly sequence of the sensor and the sensor bracket of the embodiment of the present invention.
Figure 10B:
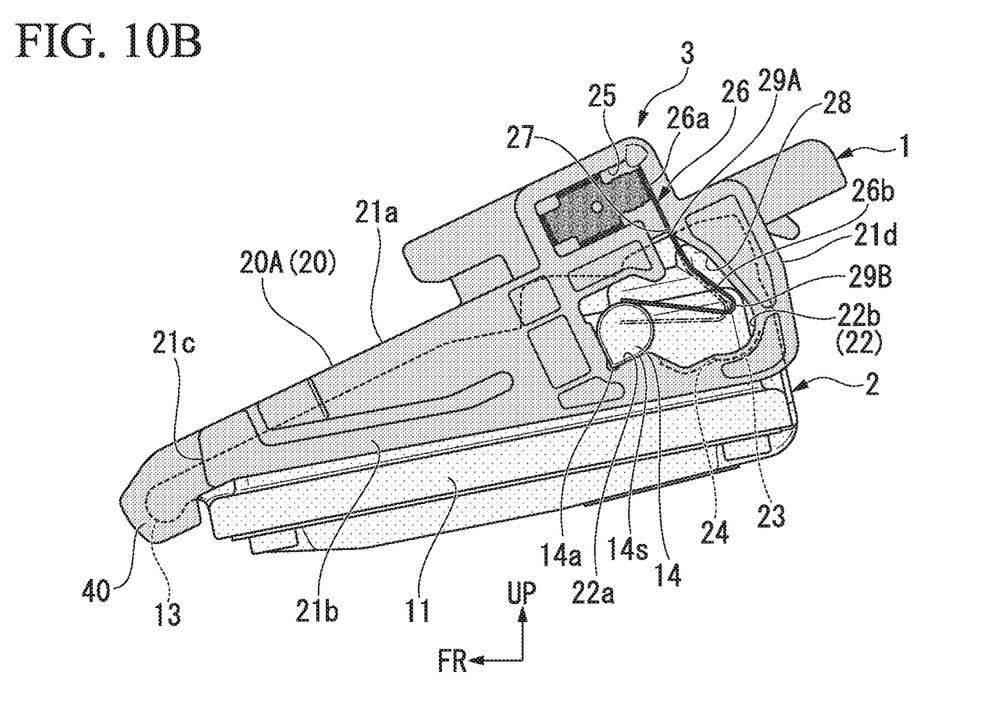
FIG. 10B is a side view showing the assembly sequence of the sensor and the sensor bracket of the embodiment of the present invention.

FIG. 9, FIG. 10A and FIG. 10B are views showing aspects when the sensor 2 and the sensor bracket 1 are assembled.

In actuality, when the sensor 2 and the sensor bracket 1 are assembled, the groove 24 (see FIG. 8) of the sensor bracket 1 on the front side of the movement restricting wall 23 is positioned to come over the left and right engaging protrusions 14 of the sensor 2, and in this state, the sensor bracket 1 covers and is attached to the upper section of the sensor 2. Accordingly, the left and right engaging protrusions 14 of the sensor 2 are inserted into the assembly holes 22 through the groove 24 corresponding to the sensor bracket 1 (see FIG. 10A). Here, the engaging protrusions 14 abut regions of plate springs 26 closer to the tips than to the second bending deformation sections 29B, and press the deformation regions 26b of the plate springs 26 toward a rear upper side. Accordingly, the plate springs 26 are bent and deformed at the first bending deformation sections 29A close to the base sections of the deformation regions 26b and the second bending deformation sections 29B that serve as folded sections.

Next, when the sensor 2 is displaced forward with respect to the sensor bracket 1 from this state, the engaging protrusions 14 of the sensor 2 slides forward over the first locking walls 22aA in the assembly holes 22 to abut the second locking walls 22aB of the locking concave sections 22a (see FIG. 10B). Here, the engaging protrusions 14 receive biasing forces of the plate springs 26 such that a state of being fitting to the locking concave sections 22a is maintained. Here, the engaging claws 13 of the front end portion of the sensor 2 are disposed in the restriction frame sections 40 corresponding to the sensor bracket 1. Assembly of the sensor 2 and the sensor bracket 1 is thus completed as described above.

In addition, conversely, when the sensor 2 is removed from the sensor bracket 1, the sensor 2 is displaced rearward against a biasing force of the plate springs 26 from a state shown in FIG. 10B to a state shown in FIG. 10A. Here, the engaging claws 13 on the side of the front section of the sensor 2 are removed from the inside of the restriction frame sections 40, and the left and right engaging protrusions 14 on the side of the rear section of the sensor 2 slide on the first locking wall 22aA in the assembly holes 22 to be displaced toward a rear side of the first locking wall 22aA. Here, since the sensor 2 is pressed by a worker against the biasing force of the plate springs 26, when the biasing force of the plate springs 26 is released at the time the left and right engaging protrusions 14 move onto the groove 24, the force of a pressing operation is abruptly increased. For this reason, if the movement restricting wall 23 is assumed to be absent on the rear side of the groove 24, there is a possibility that the sensor 2 may be rapidly removed downward from the groove 24 in a state the force is increased. However, in the sensor bracket 1 of the embodiment, since the movement restricting wall 23 is disposed in the vicinity of the rear side of the groove 24, when the force of the pressing operation is increased at the time the left and right engaging protrusions 14 move onto the groove 24, the left and right engaging protrusions 14 move rearward beyond the position of the groove 24 of the rear section of the first locking wall 22aA and are placed on the movement restricting wall 23 of the rear section of the groove 24. As a result, the sensor 2 is temporarily placed on the sensor bracket 1.

Next, the sensor 2 is moved forward from this state, the left and right engaging protrusions 14 of the sensor 2 move to an upper position of the groove 24 in front of the movement restricting wall 23, and the sensor 2 is pressed downward in this state. As a result, the sensor 2 is removed from below the sensor bracket 1.

As described above, in the sensor bracket 1 according to the embodiment, since the plate springs 26 configured to bias the engaging protrusions 14 of the sensor 2 have a plurality of bending deformation sections (the first bending deformation sections 29A and the second bending deformation sections 29B), generation of stress concentration to portions of the plate springs 26 can be prevented. Accordingly, when the sensor bracket 1 of the embodiment is employed, plastic deformation or aging degradation of the plate springs 26 can be suppressed.

In addition, in the case of the sensor bracket 1 according to the embodiment, since the plate springs 26 include the first bending deformation sections 29A and the second bending deformation sections 29B in different bending directions with each other, a biasing reaction force applied to the plate springs 26 is distributed in a plurality of directions, and generation of stress concentration on portions of the plate springs 26 can be effectively suppressed.

In addition, in the sensor bracket 1 according to the embodiment, the first bending deformation sections 29A are installed in the vicinity of the base sections 26a of the plate springs 26, and the second bending deformation sections 29B formed in substantially a V shape are installed closer to the tips than to the first bending deformation sections 29A of the plate springs 26. For this reason, when a biasing reaction force is applied to the plate springs 26, since the folded sections that are the second bending deformation sections 29B are smoothly deformed, stress applied to the first bending deformation sections 29A on the side of the base sections 26a can be greatly attenuated. In the case of the configuration, since excessive deformation of the first bending deformation sections 29A using the sections of the plate springs 26 near the base sections 26a serving as an origin can be suppressed, the engaging protrusions 14 of the sensor 2 can be stably pressed by the locking concave sections 22a.

Further, in the sensor bracket 1 according to the embodiment, the support section length L1 of the base sections 26a of the plate springs 26 by the bracket main body 20 is set to a length of a half of less than a half of the length L3 obtained by adding the support section length L1 and the length L2 which is a length from the first bending deformation sections 29A to the second bending deformation sections 29B. For this reason, with respect to the support section length L1 of the base sections 26a of the plate springs 26, a region length available for the bending deformation between the first bending deformation sections 29A and the second bending deformation sections 29B can be sufficiently secured. Accordingly, generation of large stress concentration on the first bending deformation sections 29A in the section of the plate springs 26 near the base sections 26a can be more effectively suppressed.

In addition, the deformation regions 26b of the plate springs 26 are accommodated in the sensor bracket 1 according to the embodiment, the assembly holes 22 configured to allow abutting and separating of the engaging protrusions 14 with respect to the locking concave sections 22a are formed in the bracket main body 20, and the supporting point parts 27 abutting the plate springs 26 and the concave sections 28 configured to allow bending deformation of the plate springs 26 about the supporting point parts 27 are installed on the inner walls in the assembly holes 22. For this reason, while the sensor bracket 1 according to the embodiment has a structure in which the deformation regions 26b of the plate springs 26 are accommodated in the assembly holes 22 of the bracket main body 20, it is possible to allow the bending deformation at the first bending deformation sections 29A by the concave sections 28. Accordingly, when the sensor bracket 1 is employed, the biasing force of the plate springs 26 that presses the engaging protrusions 14 can be stably obtained while protecting the plate springs 26 from the outside.

Figure 11:
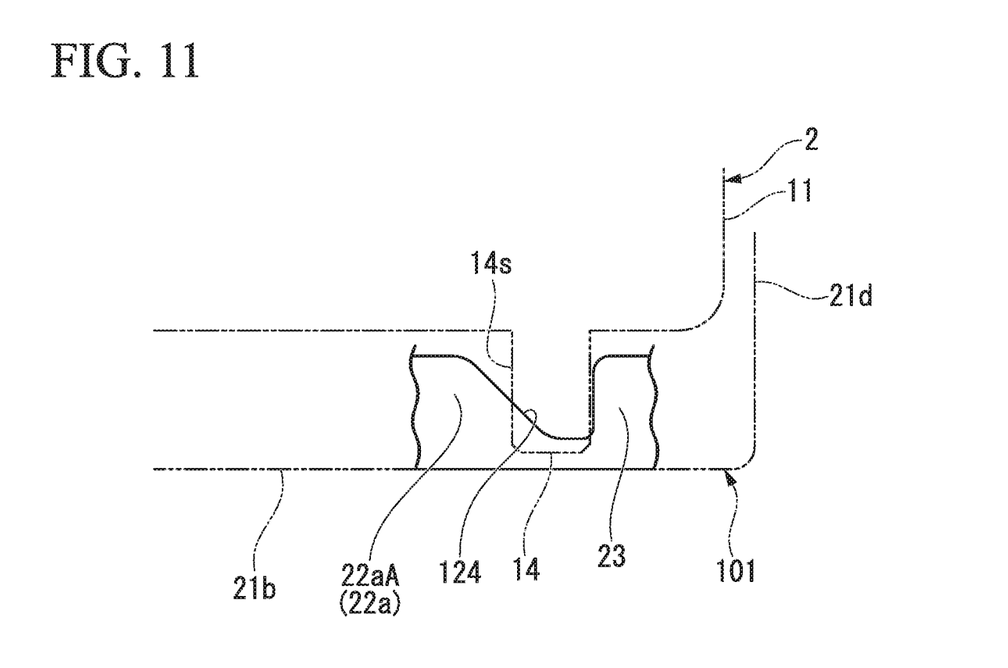
FIG. 11 is a view of a sensor bracket of another embodiment of the present invention taken along an arrow VIII of FIG. 6.

FIG. 11 is a schematic view of a sensor bracket 101 according to another embodiment similar to FIG. 8.

The sensor bracket 101 of the other embodiment is distinguished from the above-mentioned embodiment in that a shape and a size of a groove 124 formed between the first locking wall 22aA of the locking concave section 22a and the movement restricting wall 23 is different from those of the embodiment.

The groove 124 of the sensor bracket 101 has a notch-shaped groove, and when seen from above, an opening area that overlaps with the engaging protrusions 14 is set to be smaller than a projection area when the engaging protrusions 14 are projected on an extension section of the movement restricting wall 23. In the case of the embodiment, when the sensor 2 is assembled to the sensor bracket 101 or the sensor 2 is removed from the sensor bracket 101, by pressing the engaging protrusions 14 on the side of the sensor 2 against a portion of the groove 124, the groove 124 can be pressed and widened and the engaging protrusions 14 can pass vertically over a front side of the movement restricting wall 23.

Accordingly, it is possible to even further suppress the abrupt downward movement (removal) of the engaging protrusions 14 through the groove 124 when the sensor 2 is assembled to the sensor bracket 101 or the sensor 2 is removed from the sensor bracket 101, and to improve the workability.

Further, the present invention is not limited to the above-mentioned embodiment and various modifications may be made without departing from the scope of the present invention. For example, while the biasing piece configured to bias the engaging protrusion is formed as a plate spring separate from the bracket main body in the above-mentioned embodiment, the biasing piece may be formed integrally with the bracket main body. In addition, the number of bending deformation sections formed in the biasing piece is not limited to two and may be three or more.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A sensor bracket that holds a sensor which is attached to an inner surface of a glass windshield of a vehicle, the sensor having an engaging protrusion and a lens section is directed towards the front of the vehicle, the sensor bracket comprising:
    a groove that is formed in a bracket main body of the sensor bracket and through which the engaging protrusion is capable of being inserted in an upward/downward direction,
    an engaging claw that is formed in a forward side of the bracket main body with respect to the groove and that is configured to lock a front edge portion of the sensor and the sensor bracket,
    a locking wall that is formed adjacent to the groove on the bracket main body of the sensor bracket and to which a side surface of the engaging protrusion is locked in a pressed state, the side surface of the engaging protrusion being formed so as to cross with a protruding direction of the engaging protrusion; and
    a biasing piece having a base section and a tip region, the base section being formed so as to be supported by the bracket main body, the tip region being formed so as to abut the side surface of the engaging protrusion and to bias the engaging protrusion in a direction pressing against the locking wall,
    wherein the sensor is attachable and detachable with respect to the sensor bracket by aligning the engaging protrusion with the groove in the upward/downward direction,
    wherein a plurality of bending deformation sections bent in a state in which the biasing piece is biasing the engaging protrusion against the locking wall are installed between the base section and the tip region of the biasing piece.

2. The sensor bracket according to claim 1,
    wherein the plurality of bending deformation sections comprise at least two bending deformation sections having different bending directions with each other.

3. The sensor bracket according to claim 2,
    wherein a folded section curved in substantially a V shape as an initial shape is formed in a deformation region closer to the tip region than to the base section of the biasing piece,
    a section among the deformation region of the biasing piece near the base section is formed as a first bending deformation section of the biasing piece, and
    the folded section is made as a second bending deformation section of the biasing piece.

4. The sensor bracket according to claim 3,
    wherein the biasing piece is configured as a separate member from the bracket main body, and
    a support section length of the base section of the biasing piece supported by the bracket main body is set to a length of a half or less than a half of a length obtained by adding the support section length and a length from the first bending deformation section to the second bending deformation section.

5. The sensor bracket according to claim 1,
    wherein a folded section curved in substantially a V shape as an initial shape is formed in a deformation region closer to the tip region than to the base section of the biasing piece,
    a section among the deformation region of the biasing piece near the base section is formed as a first bending deformation section of the biasing piece, and
    the folded section is made as a second bending deformation section of the biasing piece.

6. The sensor bracket according to claim 5,
    wherein the biasing piece is configured as a separate member from the bracket main body, and
    a support section length of the base section of the biasing piece supported by the bracket main body is set to a length of a half or less than a half of a length obtained by adding the support section length and a length from the first bending deformation section to the second bending deformation section.

7. The sensor bracket according to claim 5,
wherein the bracket main body further including a supporting point part comprises a displacement allowing chamber that accommodates the deformation region closer to the tip region of the biasing piece at more inner side than the base section of the biasing piece and that allows abutting and separating of the engaging protrusion with respect to the locking wall, and
at an inner wall of the displacement allowing chamber, the supporting point part, to which the first bending deformation section of the biasing piece abuts and which serves as a deformation supporting point of the first bending deformation section, and a concave section, which allows bending deformation of the biasing piece about the supporting point part, are formed.

\* \* \* \* \*